_United States Patent_ [19]

Klunder

[11] 4,070,445
[45] Jan. 24, 1978

[54] REDUCTION OF AQUEOUS THIOSULFATE SOLUTIONS

[75] Inventor: Edgar B. Klunder, Pittsburgh, Pa.

[73] Assignee: Continental Oil Company, Ponca City, Okla.

[21] Appl. No.: 583,211

[22] Filed: May 29, 1975

[51] Int. Cl.$^2$ .................... C01D 7/00; C01B 17/00
[52] U.S. Cl. ................................. 423/428; 423/566; 423/242
[58] Field of Search .............................. 423/242–244, 423/428, 561 A, 561 R, 566; 260/542

[56] References Cited

U.S. PATENT DOCUMENTS

| 3,574,097 | 4/1971 | Urban | 423/428 X |
| 3,584,042 | 6/1971 | Yavorsky et al. | 260/542 |
| 3,592,850 | 7/1971 | Mazzocco et al. | 260/542 |
| 3,687,614 | 8/1972 | Yavorsky et al. | 423/514 |
| 3,690,824 | 9/1972 | Gorin et al. | 423/244 X |
| 3,838,191 | 9/1974 | Urban | 423/242 |

Primary Examiner—O. R. Vertiz
Assistant Examiner—Gregory A. Heller
Attorney, Agent, or Firm—F. Lindsey Scott; D. Leigh Fowler, Jr.; William A. Mikesell, Jr.

[57] ABSTRACT

Sodium, potassium and ammonium thiosulfates may be converted to a mixture of the corresponding carbonates and sulfides by first partially reducing the thiosulfate with CO to formate in a first reduction zone, and then using the formate so produced to effect further reduction of the thiosulfate in a second reduction zone.

5 Claims, 4 Drawing Figures

REDUCTION OF AQUEOUS THIOSULFATE SOLUTIONS

CROSS-REFERENCE TO RELATED APPLICATIONS

Related applications describing and claiming certain subjects matter hereinafter disclosed are (1) an application, Ser. No. 358,786, filed May 9, 1973, entitled "Treatment of Gases Containing Sulfur Dioxide" to be issued Feb. 10, 1976 as U.S. Pat. No. 3,937,787; and (2) an application, Ser. No. 410,722, filed Oct. 29, 1973, entitled "Treatment of Gases Containing Sulfur Dioxide" to be issued Feb. 10, 1976 as U.S. Pat. No. 3,937,788.

BACKGROUND OF THE INVENTION

1. Field of the Invention

This invention relates to the conversion of an aqueous thiosulfate solution to a mixture of carbonates and sulfides in aqueous solution which is suitable for use in connection with the scrubbing of flue gases to remove $SO_2$. The thiosulfate may be sodium, potassium, or ammonium thiosulfate.

2. Description of the Prior Art

The conversion of aqueous thiosulfate to a mixture of carbonates and sulfides according to the following equations is well known.

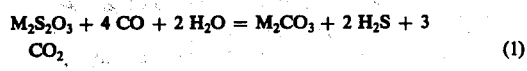

$$M_2S_2O_3 + 4 CO + 2 H_2O = M_2CO_3 + 2 H_2S + 3 CO_2 \quad (1)$$

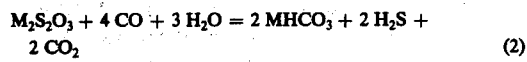

$$M_2S_2O_3 + 4 CO + 3 H_2O = 2 MHCO_3 + 2 H_2S + 2 CO_2 \quad (2)$$

$$M_2S_2O_3 + 4 CO + H_2O = 2 MHS + 4 CO_2 \quad (3)$$

where M is Na, K, or $NH_4$. Other sulfides, e.g. $M_2S$ and $M_2S_x$ may also be formed.

The reduction of aqueous $M_2S_2O_3$ according to the above expressed reactions is inexplicably variable and unpredictable in liquid phase at elevated temperatures under most conditions. The rate of reaction is unpredictable and generally undesirably slow, with a resulting inordinately long residence time.

The reduction of aqueous $M_2S_2O_3$ by means of formate, MOOCH, where M may be Na, K, or $NH_4$, may be expressed by the following reactions:

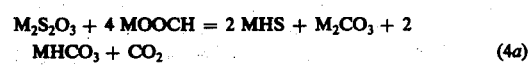

$$M_2S_2O_3 + 4 MOOCH = 2 MHS + M_2CO_3 + 2 MHCO_3 + CO_2 \quad (4a)$$

$$CO_2 + M_2CO_3 + H_2O = 2 MHCO_3 \quad (5)$$

This reaction is relatively fast, and the rate is significantly increased with increase in temperature. Accordingly, in the flue gas scrubbing process described in U.S. Pat. No. 3,690,824 wherein the spent absorbent contains $M_2S_2O_3$ and MOOCH as the major constituents, the formate is used to reduce the thiosulfate to carbonates and hydrosulfide as set forth in equations (4a) and (4b).

In certain flue gas scrubbing processes, the spent absorbent contains $M_2S_2O_3$ as the principal constituent but there is no formate, or at most, only a minor amount of formate present. Illustrative of patents showing such spent absorbents are British Patent No. 1,389,372 and U.S. Pat. No. 3,859,416. No advantage is taken in these processes of the rapid rate of reaction between formate and thiosulfate to form carbonates and sulfides which are used as $SO_2$ absorbent and sulfite-reducing agent respectively in such processes.

Patents which contain certain features of the present invention include the following: Br. Pat. No. 1,389,372; U.S. Pat. No. 3,687,615; U.S. Pat. No. 3,584,042; U.S. Pat. No. 3,690,818; U.S. Pat. No. 3,592,850; U.S. Pat. No. 3,690,824; U.S. Pat. No. 3,649,183; U.S. Pat. No. 3,718,691; U.S. Pat. No. 3,687,614; U.S. Pat. No. 3,859,416.

The term "carbonate" as used herein and in the claims, means either $M_2CO_3$ or $MHCO_3$, unless otherwise so indicated. The term "sulfide" as used herein and in the claims, means MHS, $M_2S$, $M_2S_x$, or mixtures thereof, unless otherwise so indicated.

SUMMARY OF THE INVENTION

The present invention, in its broadest aspects, comprises the following two steps for converting an aqueous $M_2S_2O_3$ solution to an aqueous solution containing carbonates and sulfides. The first step is contacting a reducing gas containing CO with the aqueous $M_2S_2O_3$ solution in liquid phase under reducing conditions selected to favor the production of MOOCH and continuing the reaction until a mixture of formate and unconverted thiosulfate is obtained wherein only sufficient MOOCH, stoichiometrically, has been produced to react with a predetermined amount of the unconverted $M_2S_2O_3$. Generally, for practical reasons, between 20 and 90 weight percent of the total thiosulfate converted in the process is converted in this first step. The second step is maintaining the effluent aqueous solution from the first step in liquid phase under reducing conditions selected to effect reaction of MOOCH formed in the first step with unreacted $M_2S_2O_3$ from the first step, to yield an aqueous solution containing carbonate and sulfide. The two steps may be performed in two separate vessels or in one vessel, as will be shown later.

The outstanding advantages of the above broadly stated invention are (1) the relative rapidity of the conversion of each unit of $M_2S_2O_3$ to the desired product; (2) the adaptability of the process to the selection of the optimum reactor vessel; and (3) complete control over the formate content of the product. As a consequence of such control, the formate content of the absorbent solution used in the $SO_2$ scrubber may be reduced, whereby the production of sulfate is reduced.

DESCRIPTION OF THE DRAWINGS

For a better understanding of my invention, its objects and advantages, reference should be had to the accompanying drawings in which:

Referring to FIG. 1 of the drawings, there is shown a flowsheet of a process embodying my invention in its broadest aspects. An aqueous solution of $M_2S_2O_3$, introduced through a conduit 10, is suitably contacted in a reaction zone 11 in a reactor vessel 12 with a CO-containing reducing gas introduced through a conduit 14. A liquid phase is maintained in the reaction zone 11 under conditions which favor the production of formate in accordance with the following reactions:

Figure 1:
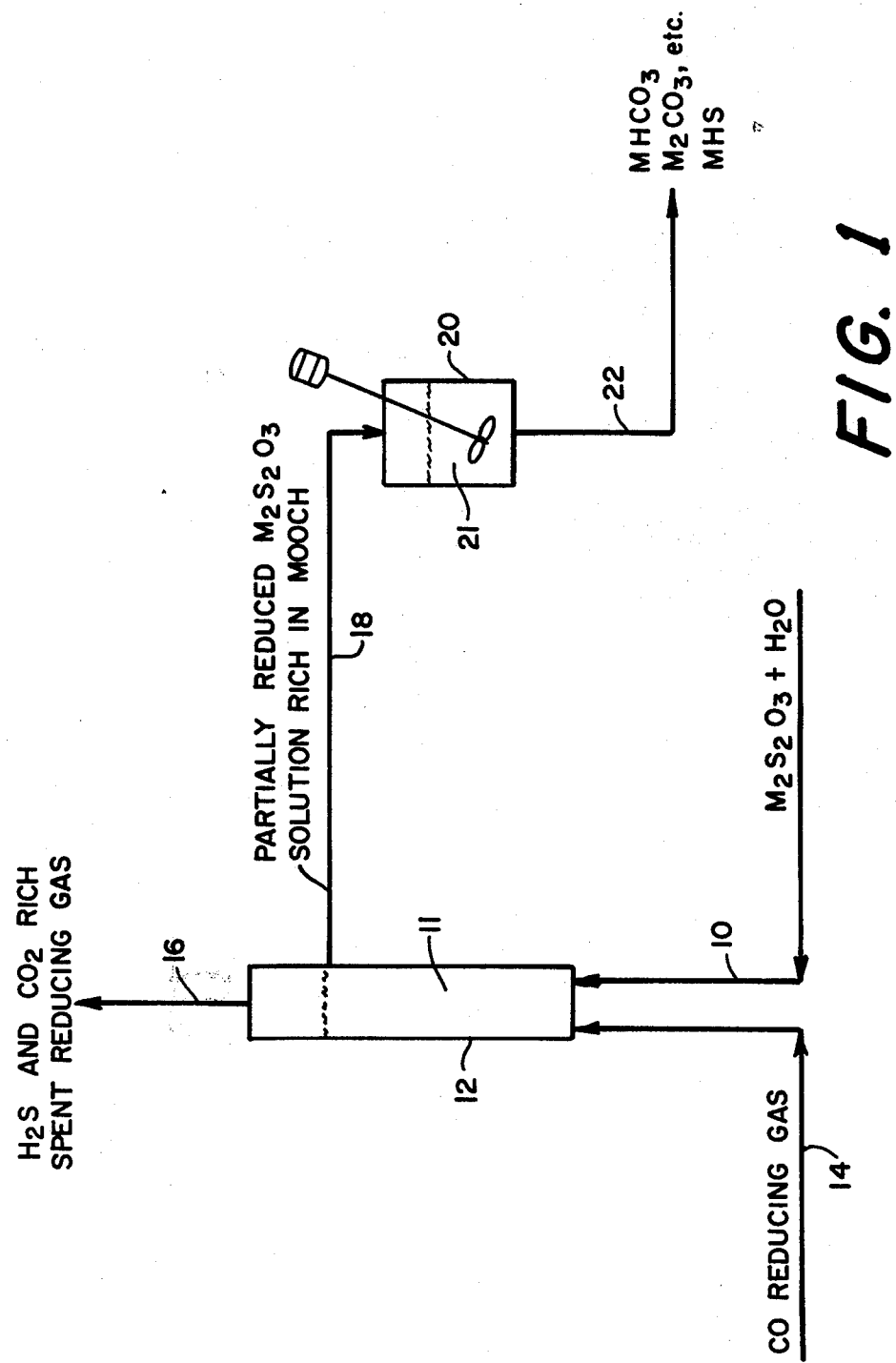
FIG. 1 is a schematic flowsheet of my invention in its broadest aspects.

$$MHCO_3 + CO = MOOCH + CO_2 \quad (5)$$

$$M_2CO_3 + 2CO + H_2O = 2\,MOOCH + CO_2 \quad (6)$$

$$MHS + CO_2 + H_2O = MHCO_3 + H_2S \quad (7)$$

As stated earlier, the reaction rate of CO with $M_2S_2O_3$ is slow. However, the reaction rate of CO with carbonate is considerably faster. The carbonate is initially produced according to equations (1) and (2) and then by the faster reaction (4a) once the reaction sequence has been started. Hence, very fast reduction of the thiosulfate to formate can be readily achieved which is limited only by the mass transfer of CO into the solution. Suitable conditions maintained in reaction zone 11 are as follows:

Temperature, °F.: 400 – 500
Pressure, psig.: 400 – 800

However, the above conditions are not critical, and operation outside these ranges is feasible. Excess CO is used over that stoichiometrically required. If desired, a suitable catalyst may be used. The effluent gaseous product $H_2S$, $CO_2$, and unconverted CO, is discharged through conduit 16. The residence time in reaction zone 11 is regulated to ensure that a mixture of MOOCH and unconverted $M_2S_2O_3$ is produced which contains sufficient MOOCH to complete the reduction of a predetermined amount of the unconverted $M_2S_2O_3$ in a separate zone.

The effluent aqueous solution of unconverted $M_2S_2O_3$ and MOOCH is conducted by a conduit 18 to a stirred reactor 20. In this reactor, a liquid phase reaction zone 21 is maintained under conditions favoring the reaction of $M_2S_2O_3$ with MOOCH to yield $M_2CO_3$, $MHCO_3$ and MHS pursuant to equation (4), together with any deliberately non-reduced $M_2S_2O_3$. Suitable conditions are as follows:

Temperature, °F.: 450 – 550
Pressure (psi): 400 – 800

Again, these conditions are not critical.

The product is withdrawn through conduit 22. The relative proportions of carbonate and MHS (together with associated sulfides, e.g. $M_2S$, $M_2S_x$) may be suitably adjusted to meet the requirements of the $SO_2$ scrubbing circuit where the carbonate is used to absorb $SO_2$ to form sulfite and the MHS is used to reduce the sulfite to thiosulfate.

Figure 2:
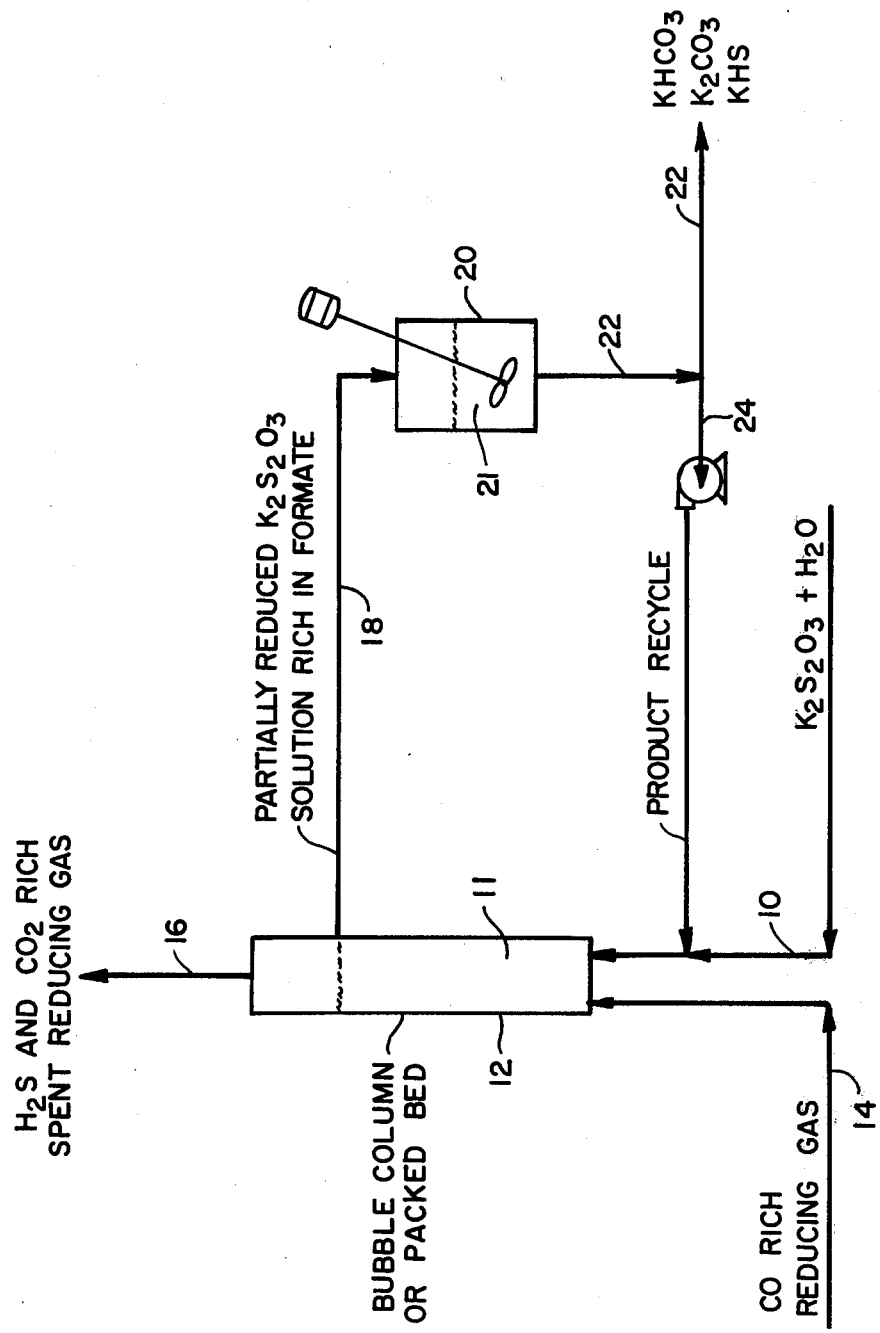
FIG. 2 is a schematic flowsheet of a preferred embodiment of my invention.

Referring to FIG. 2 of the drawings, there is shown a preferred embodiment of my invention. The essential process difference between this embodiment and the process in its broadest aspects is the recycle of part of the product from the second step of the process back to the first step. Since the product contains carbonate as an essential component, the induction time previously mentioned for the CO reaction with thiosulfate is eliminated. Thus, the total time required to convert the thiosulfate to the desired product is significantly shortened.

Referring to FIG. 2, the same numbers are used in the drawing to designate corresponding parts. In this preferred embodiment, $K_2S_2O_3$ is used. Also, the feed solution introduced through conduit 10 may already contain some KOOCH, if it is the spent solution from the scrubbing circuit described in the above-mentioned cross-referenced applications or in British Patent No. 1,389,372. The amount of formate may range from 0 to preferably not more than 30 weight percent because it apparently promotes the formation of the undesirable refractory sulfate in the scrubber when carbonate is used as the $SO_2$ absorbent.

The CO-containing reducing gas is preferably a mixture of CO, $CO_2$ and $H_2$ such as may be conveniently obtained by the partial oxidation of methane-rich gas to make synthesis gas or variants thereof in the well-known manner.

The overall reaction between CO and thiosulfate is preferably conducted in a bubble column or a packed bed column. Such columns very definitely are superior to simply stirred tanks in enhancing the rapidity of the overall reaction between CO and thiosulfate to make formate. Furthermore, such columns have lower investment and operating costs as well as increased reliability. In a bubble column, a high gas flow rate through the reactor, rather than a mechanical stirrer, provides the agitation necessary for satisfactory liquid-gas contacting. Another advantage of the bubble column is its operability at much higher salt concentrations than are possible in the stirred tank reactor. Total concentrations approaching 60 weight percent of thiosulfate and any accompanying solutes were successfully used.

The conditions maintained in the reaction zone 11 are as follows:

Temperature, °F.: 400–500
Pressure, psig.: 400–800

The reduction of the $K_2S_2O_3$ effected in this reaction zone 11 is preferably between 20 and 50 weight percent of the total thiosulfate converted in the two reaction zones 11 and 21, but in any case is sufficient to result in a mixture of $K_2S_2O_3$ and KOOCH containing sufficient KOOCH to accomplish the desired reduction of the remaining thiosulfate in the stirred reactor 20. The conditions maintained in the reaction zone 21 are as follows:

Temperature, °F.: 450–550
Pressure, psig.: 400–800

As previously stated, a portion of the product from the reactor 20 is recycled through a conduit 24 to the liquid feed line 10. Preferably, the ratio of recycle to net product by weight is between about 0.5 and 2.

Thus, by suitable regulation of the conversion of thiosulfate in reactor 12, not only is the total conversion by the two steps expedited, but also the composition of the product may be adjusted.

Figure 3:
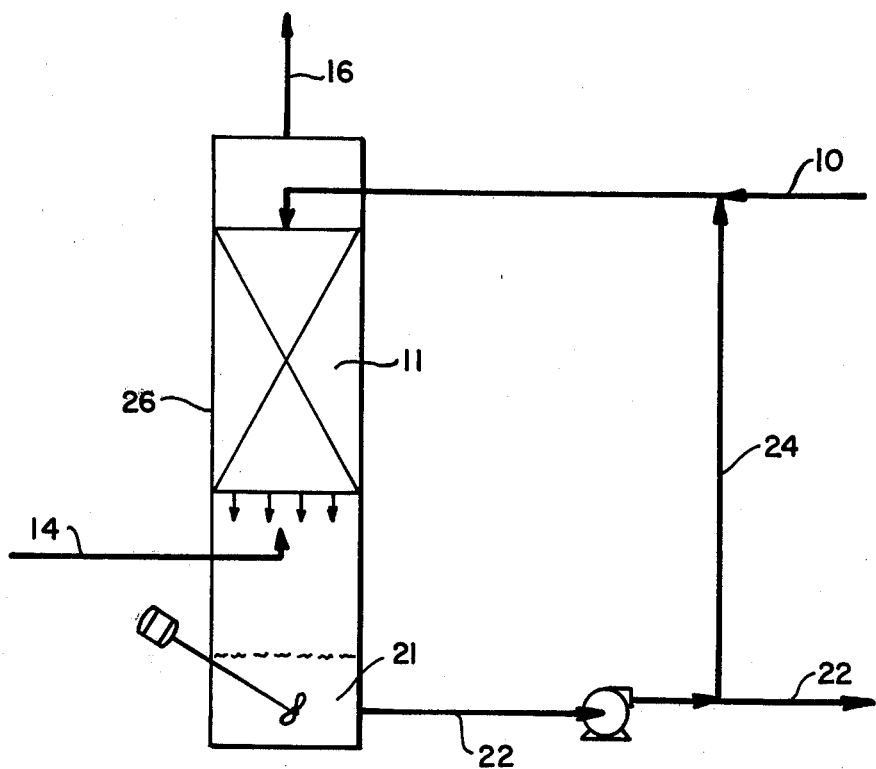
FIG. 3 is a schematic flowsheet of an alternative preferred embodiment of my invention.

The two reaction zones of the present invention do not have to be in separate vessels. For instance, referring to FIG. 3, where again corresponding numbers designate corresponding parts, reaction zones 11 and 21 are confined in a single vessel 26. Reaction zone 11 is a packed bed where CO is absorbed by the aqueous thiosulfate to yield a mixture of formate and thiosulfate, and reaction zone 21 is a sump where the formate reduces a predetermined amount of the thiosulfate. While FIG. 3 shows countercurrent gas flow, cocurrent flow may also be used.

Figure 4:
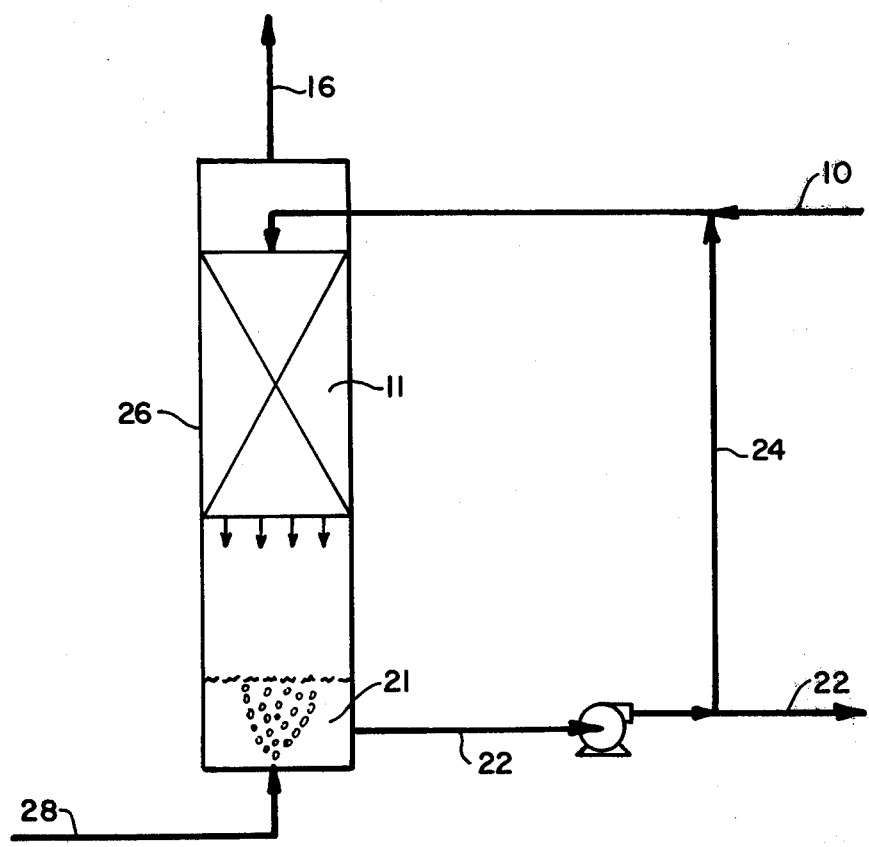
FIG. 4 is a schematic flowsheet of still another preferred embodiment of my invention.

Referring to FIG. 4, where again corresponding numbers designate corresponding parts, CO-reducing gas is introduced into reaction zone 21 through a conduit 28 merely for low power agitation to replace a stirrer. The linear gas velocity is, in this case, much less than for a bubble column, and thus little if any CO absorption is envisioned in reaction zone 21. (A bubble column designed for the same gas flow would be much taller and with a smaller diameter).

The following tables set forth the essential details of a "run" conducted in a bubble column to demonstrate the first step of the process of the present invention, namely the reaction of CO with thiosulfate to produce a mixture of formate and thiosulfate. The reaction of CO with carbonate, and the reaction of formate with thiosulfate have been amply demonstrated and described in the prior art, for example, in U.S. Pat. Nos. 3,584,042; 3,592,850; and 3,687,614.

The following Table I reports the composition of the feed to the first reactor which, as stated above, was a bubble column.

TABLE I

| Composition of Feed[1], Wt. % | | | | | |
|---|---|---|---|---|---|
| $K_2S_2O_3$ | $KHSO_3$ | $K_2SO_4$ | KOOCH | Total $CO_2$ as $K_2CO_3$ | Total Solids |
| 39.87 | 0.54 | 0.65 | 1.90 | 0.22 | 42.20 |

[1]A typical spent $SO_2$ absorbent from a scrubbing system such as that described in Br. Pat. No. 1,389,372 and in the cross-referenced applications Serial Numbers 358,786 and 410,722.

The following Table II tabulates the essential conditions of the run.

TABLE II

| Summary of Conditions | |
|---|---|
| Gas Feed | |
| CO, SCFH | 300 |
| $CO_2$, SCFH | 150 |
| Liquid Feed | |
| Composition | (see Table I) |
| Concentration of thiosulfate, Wt. % | 39.9 |
| Rate, lb/hr | 4.8 |
| Reactor Conditions | |
| Temperature, ° F. | 496 |
| Total Salt Conc., Wt. % | ca 61 |
| Conversion of $K_2S_2O_3$, Wt. % | 52 |
| Residence Time | ca 2¼ hrs. |

The following Table III presents the composition of the product obtained from the bubble column.

TABLE III

| Composition of Product, Wt. % | | | | | | |
|---|---|---|---|---|---|---|
| $K_2S_2O_3$ | KOOCH | $K_2CO_3$ | $KHCO_3$ | KHS | $KHSO_3$ | $K_2SO_4$ |
| 19.21 | 13.21 | 3.42 | 1.78 | 0.45 | 0.01 | 1.72 |

According to the provisions of the patent statutes, the principle, preferred construction and mode of operation of the invention have been explained and what is considered to represent its best embodiment has been illustrated and described. However, it should be understood that, within the scope of the appended claims, the invention may be practiced otherwise than as specifically illustrated and described.

I claim:

1. The method of converting sodium, potassium, or ammonium thiosulfate to a mixture of the corresponding carbonates and sulfides which comprises:
   a. contacting a reducing gas containing CO with an aqueous solution of said thiosulfate in a first reduction zone under reducing conditions selected to favor the production of the corresponding formate until a mixture of formate and unconverted thiosulfate in an effluent aqueous solution is obtained wherein only sufficient formate, stoichiometrically, has been produced to react with a predetermined amount of the unconverted thiosulfate, the amount of thiosulfate converted in said first reduction zone being between 20 and 90 weight percent of the total conversion of thiosulfate effected in this and the following step (b); and thereafter
   b. maintaining said effluent aqueous solution from step (a) in liquid phase in a second reduction zone under reducing conditions selected to effect reaction of the formate formed in step (a) with unreacted thiosulfate from step (a), to yield an aqueous solution containing carbonates and sulfides.

2. The method according to claim 1 wherein said first reduction zone is maintained at a temperature between 400° and 500° F. and under a pressure between 400 and 800 p.s.i.g. and said second reduction zone is maintained at a temperature between 450° and 550° F. and under a pressure between 400 and 800 p.s.i.g.

3. The method of converting potassium thiosulfate to a mixture of the corresponding carbonates and sulfides which comprises:
   a. contacting a reducing gas containing CO with an aqueous solution of said thiosulfate in a first reduction zone maintained at a temperature between 400° and 500° F. and under a pressure between 400 and 800 p.s.i.g. until a mixture of the corresponding formate and unconverted thiosulfate in an effluent aqueous solution is obtained wherein only sufficient formate, stoichiometrically, has been produced to react with a predetermined amount of the unconverted thiosulfate, the amount of thiosulfate converted in said first reduction zone being between 20 and 90 weight percent of the total conversion of thiosulfate effected in this and the following step (b); and thereafter
   b. maintaining said effluent aqueous solution from step (a) in liquid phase in a second reduction zone at a temperature between 450° and 550° F. and under a pressure between 400 and 800 p.s.i.g. to effect reaction of the formate formed in step (a) with unreacted thiosulfate from step (a), to yield an aqueous solution containing the corresponding carbonates and sulfides.

4. The method according to claim 3 wherein a portion of the product from step (b) is recycled to step (a).

5. The method according to claim 4 wherein the conversion of potassium thiosulfate effected in step (a) is between 20 and 50 weight percent of the total conversion of thiosulfate effected in both steps (a) and (b).

* * * * *